March 27, 1951   D. J. McINTOSH ET AL   2,546,368
CHAIN STRUCTURE
Original Filed Feb. 16, 1948
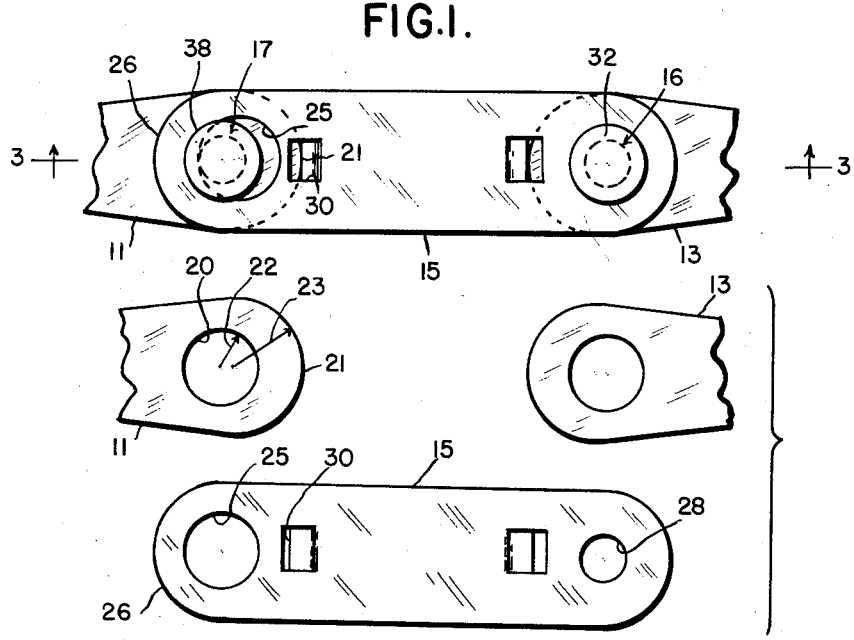
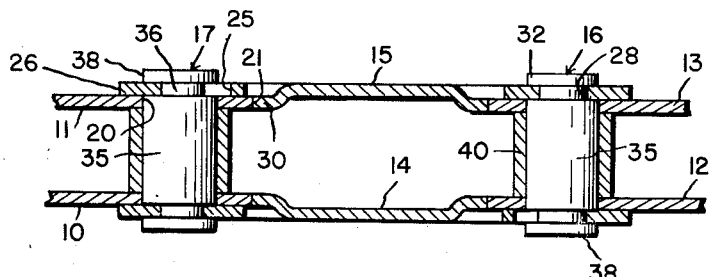
FIG.3.
*INVENTORS*
DONALD J. McINTOSH
MITCHELL SMITH
BY Whittemore, Hulbert
& Belknap ATTORNEYS Patented Mar. 27, 1951

2,546,368

UNITED STATES PATENT OFFICE 2,546,368

CHAIN STRUCTURE

Donald J. McIntosh and Mitchell Smith, Detroit, Mich.; said McIntosh assignor to said Smith Original application February 16, 1948, Serial No. 8,664. Divided and this application June 13, 1949, Serial No. 98,734

3 Claims. (Cl. 74—254)

The present invention relates to chain structure and more specifically to chain structure designed to facilitate separation between links of a sprocket chain.

The present invention is a division of our copending application, Serial 8,664, filed February 16, 1948.

It is an object of the present invention to provide a chain of the sprocket type adapted to be separated between adjacent links thereof by a simple manual operation.

More specifically, it is an object of the present invention to provide a sprocket chain having means for separating the chain between adjacent links, the separation being rendered possible by establishing an angularity between adjacent links or link plates which are greater than the angularity assumed by these parts during normal operation.

More specifically, it is an object of the present invention to provide a chain of the character described comprising alternating pairs of inside and outside link plates interconnected by pivot pins, each pivot pin being permanently attached at one end to one of the outside link plates and being detachably connected to the other outside link plate of the pair.

Still more specifically, it is an object of the present invention to provide a chain of the character described in which abutment means are provided between adjacent inside and outside link plates which prevent separation of the chain under operating conditions.

It is a further object of the present invention to provide a chain of the character described, characterized by the simplicity of the structure, the fact that the chain elements may be formed from sheet material by a simple stamping operation, and by the ease of connection and disconnection of the chain elements.

Other objects and features of the invention will become apparent as the description proceeds, especially when taken in conjunction with the accompanying drawings, wherein:

Figure 1 is a side elevation of a portion of a chain.

Figure 2 is an exploded view of some of the elements illustrated in Figure 1.

Figure 3 is a section on the line 3—3, Figure 1.

Referring now to the drawings the chain comprises a series of pairs of inside link plates, one pair comprising the link plates 10 and 11 and the adjacent pair of inside link plates being indicated at 12 and 13. Associated with the pairs of inside link plates just described is an intermediate pair of outside link plates 14 and 15.

Means are provided at one point in a continuous sprocket chain of the character described providing for ready manual separation between links of the chain and this means is illustrated in the figures as comprising pivot pins 16 and 17.

Referring now particularly to Figure 2, each of the link plates 10 and 11 comprises an elongated flat metal element having a circular opening 20 formed adjacent one end thereof. The end of the plates 10 and 11 is circular in shape as indicated at 21. The circular end surface of the plates 10 and 11 is eccentric with respect to the circular opening 20, this eccentricity being illustrated by the lines 22 and 23 indicating the centers and radii of curvature of the circular opening 20 and the circular end surface 21 respectively. The inside link plate 13 as illustrated in this figure, is of similar conformation.

The intermediate outside link plates 14 and 15 are illustrated in Figure 2 as comprising flat elongated metallic strips having at one end an enlarged circular opening 25 which is preferably concentric with respect to the round end 26 thereof, and a smaller circular opening 28 adjacent the opposite end of the outside link plates 15 and 16. Adjacent the enlarged opening 25 (and if desired also adjacent the smaller circular opening 28) are abutments 30 which are struck out of the material of the outside link plates 14 and 15.

According to one form of the present invention each of the pins 16 and 17 may be detachable from both of the outside link plates 14 and 15, in which case the link plates 14 and 15 would be provided with enlarged circular openings such as 25 at both ends thereof. However, it is preferred to make a permanent assembly of each of the outside link plates 14 and 15 and one of the pivot pins 16 and 17. Thus as seen in Figure 3, the link plate 15 is permanently connected to the pivot pin 16 by virtue of an upset or riveted portion 32 provided on the end of the pin 16 which projects through the opening 28 in the link plate 15. In like manner, the outside link plate 14 is permanently connected to the pivot pin 17.

The principal purpose of making a permanent connection between the elements just described is so that when the chain is disassembled the parts are easier to handle as will be readily apparent.

Preferably, each of the pins 16 and 17 comprises an enlarged central cylindrical portion 35, a reduced neck portion 36 adjacent the free end thereof, and an enlarged head portion 38 which is of a size to pass freely through the enlarged circular openings 20 provided adjacent the ends of the inside link plates 10, 11, 12 and 13. The enlarged central portion 35 of the pins constitutes a support for cylindrical roller sleeves 40 which may be provided in the assembled chain.

As best seen in Figure 3, when the parts are assembled the pins 16 and 17 are retained against disengagement from outside link plates 14 and 15 respectively by engagement of the headed portions 38 thereof against the outside surface of such plates. Moreover, the abutments 30 which are disposed to confront the rounded end portions 21 of the inside link plates, prevent shifting of the outside link plates to a position in which the enlarged openings 25 therein will register with the headed portions 38 at the free ends of the pivot pins.

In order to connect or disconnect the chain the pair of outside plates 14 and 15 are angularly disposed with respect to one or the other of the adjacent pairs of inside link plates. This has the effect of moving the abutment 30 around the circular end portion 21 to a point at which it is more closely adjacent to the center of the circular opening 20. This permits shifting of the pair of outside plates 14 or 15 with respect to the pivot pin or pins so that the enlarged heads 38 may be brought into registry with the enlarged circular openings 20, at which time the outside link plates 14 and 15 together with the pivot pins respectively attached thereto, may be moved outwardly away from each other out of association with the pairs of inside link plates.

It will be appreciated that in normal usage the angularity between the inside link plates and the adjacent outside link plates is relatively small and that by a proper selection of eccentricity between the center of the circular openings 20 and the circular end surfaces 21, the links may be separable only upon attainment of angularity greater than that encountered in use.

It will be observed that the structure illustrated comprises essentially a plurality of flat link elements which may be very economically manufactured by stamping. The abutment 30 provided on the outside link plates may be formed at the same time in a single operation and the chain thus is extremely economical to produce and may be readily connected and disconnected by simple manual operation.

The drawings and the foregoing specification constitute a description of the improved chain structure in such full, clear, concise and exact terms as to enable any person skilled in the art to practice the invention, the scope of which is indicated by the appended claims.

What we claim as our invention is:

1. A roller chain comprising pairs of inside plates having rounded ends and circular openings adjacent to said ends, the centers of said openings being spaced inwardly of the plates from the centers of curvature of the rounded ends, spacers intermediate the ends of said inside plates, linking structure for interconnection between adjacent pairs of inside plates and spacers comprising a pair of identical assemblies, each of which consists of an outside plate having a pin permanently secured to one end thereof, the free end of said pin having a laterally extending head thereon, the other end of said outside plate having an enlarged opening therein large enough to permit passage of the head of the pin of the companion assembly, said outside plate having a struck-out abutment shaped to confront the rounded end of the adjacent inside plate so as to prevent separation of said linking structure when in alignment with adjacent inside plates.

2. A roller chain comprising a pair of spaced links, each of which comprises a pair of inside link plates having pin-receiving openings adjacent their ends, said openings being located a greater distance from the ends of said inside plates than from edge portions angularly spaced from said ends, headed pins extending through said openings, outside plates having openings at their ends for receiving said pins, at least one of the openings of each of said plates being large enough to pass the head of the adjacent pin and to engage thereunder, and struck-out abutments on said outside plates cooperable with the ends of said inside plates to retain said outside plates engaged under the heads of said pins when said plates are aligned, and to permit separation between said outside plates and pins when said plates are angularly disposed.

3. For use in roller chain structure, an article of manufacture comprising a flat sheet metal plate, a pin projecting laterally from said plate adjacent one end thereof and permanently secured thereto, said pin having a laterally projecting portion adjacent its free end, said plate having an opening adjacent its other end large enough to pass the free end of the pin of a like member, and a struck-out abutment on said plate adjacent the opening therein.

DONALD J. McINTOSH.
MITCHELL SMITH.

REFERENCES CITED

The following references are of record in the file of this patent:

UNITED STATES PATENTS

| Number | Name | Date |
|--------|------|------|
| 581,071 | Jacquet | Apr. 20, 1897 |
| 1,429,518 | McMahon | Sept. 19, 1922 |
| 1,464,267 | Harrison | Aug. 7, 1923 |

FOREIGN PATENTS

| Number | Country | Date |
|--------|---------|------|
| 34,581 | France | Feb. 26, 1929 |